United States Patent [19]

Pacaud et al.

[11] Patent Number: 5,001,098

[45] Date of Patent: Mar. 19, 1991

[54] 5A ZEOLITE/KAOLINITE ADSORBENT FOR GAS PURIFICATION

[75] Inventors: Bernard Pacaud, Nanterre; Marc Mercier, Ales, both of France

[73] Assignee: Rhone-Poulenc Chimie, Courbevoie, France

[21] Appl. No.: 220,253

[22] Filed: Jul. 18, 1988

[30] Foreign Application Priority Data

Jul. 17, 1987 [FR] France .................. 87 10109

[51] Int. Cl.$^5$ .................. B01J 21/16; B01J 29/06
[52] U.S. Cl. .................................................. 502/68
[58] Field of Search ........................................ 502/68

[56] References Cited

U.S. PATENT DOCUMENTS

| | | | |
|---|---|---|---|
| 2,973,327 | 2/1961 | Mitchell et al. | 502/68 |
| 3,158,579 | 11/1964 | Pollitzer et al. | 502/68 |
| 3,219,590 | 11/1965 | Ribaud | 502/68 |
| 3,384,602 | 5/1968 | Robinson | 502/68 |

Primary Examiner—Carl F. Dees
Attorney, Agent, or Firm—Burns, Doane, Swecker & Mathis

[57] ABSTRACT

Adsorbent material well adapted for the purification of gases (notably by the PSA and TSA methods) by adsorbing impurities therefrom that are more polar or polarizable than the gases to be purified, e.g., nitrogen, the oxides of carbon and hydrocarbons, comprises a matrix of a type 5A zeolite molecular sieve and a kaolinite clay binder therefor, the clay binder having a concentration of at least 75% by dry weight of kaolinite and a maximum quartz concentration of 20% by dry weight.

10 Claims, No Drawings

5A ZEOLITE/KAOLINITE ADSORBENT FOR GAS PURIFICATION

BACKGROUND OF THE INVENTION

1. Field of the Invention

The present invention relates to an improved adsorbent/process for the purification of atmospheric, industrial and other gases, and, more especially, to an adsorbent based on a molecular sieve of the zeolite type used in the processes of gas purification designated PSA or "Pressure Swing Adsorption" or TSA "Temperature Swing Adsorption". These methods entail passing the gas to be purified over an adsorbent under a high pressure and at a low temperature, then regenerating the adsorbent either by decompression (PSA) employing a very short cycle time on the order of a few minutes, or by heating (TSA), with cycle times generally on the order of a few hours.

This invention is particularly related to PSA and TSA processes wherein the proportion of adsorbed materials occupying the surface of the adsorbent is low. By "proportion of adsorbed materials occupying the surface of the adsorbent" is intended the ratio of the mass of the material adsorbed at a given pressure and temperature to the maximum amount of gas capable of being adsorbed on a predetermined volume of the adsorbent. In the PSA and TSA methods consistent herewith, the proportion of the surface of the adsorbent occupied is generally less than 15%.

2. Description of the Prior Art

The use of a zeolite of the 5A type for the purification of gases by the adsorption of $CO_2$, $CO$, $N_2$, $NH_3$, hydrocarbons, etc., is known to this art. Compare, in particular, French Patent No. 2,232,511.

These compounds are often present as impurities in processes for the recovery of hydrogen, for example from cracked gaseous ammonia, or in natural gas reforming processes.

The aforesaid '511 patent describes a 5A type zeolite having an exchange coefficient between the $Na^+$ cation and a divalent cation, advantageously calcium, of at least equal to 80%.

However, such zeolite, used without a binder, has a low degree of crystallization, resulting in a decrease in adsorption capacity. Furthermore, the preparation of a zeolite having enhanced capacity is relatively difficult and expensive.

It too is known to thus use type A zeolites mixed with a binder, for example a clay binder, such as montmorillinite, sepiolite or attapulgite. The adsorbent obtained in this manner is used for drying gases, desulfurization or the adsorption of $CO_2$. However, the addition of a clay binder, while making it possible to reinforce the mechanical properties of the adsorbent, results in a significant reduction in the adsorbent properties thereof, in particular relative to certain compounds. This reduction, which is not dramatic for certain applications, such as drying, is in contrast a major disadvantage in the case of use of an adsorbent having a low exchange capacity (less surface occupied) such as in the PSA and TSA methods under consideration.

SUMMARY OF THE INVENTION

Accordingly, a major object of the present invention is the provision of an improved adsorbent comprising a molecular sieve of the zeolite type and a clay binder therefor, namely, a kaolin type clay, and wherein the capacity for adsorption of the zeolite material is maintained most satisfactorily.

Another object of this invention is the provision of an improved adsorbent having sufficient mechanical properties as to permit its use in a purification process by the PSA or TSA method.

Briefly, the present invention features an adsorbent for the purification of gases by the adsorption of impurities more polar or more polarizable than the gas or gases to be purified, and wherein the proportion of the surface of the adsorbent occupied by the adsorbed impurities is low. The subject adsorbent is based on a molecular sieve and is characterized in that it comprises a molecular sieve of the zeolite type and a clay binder therefor of the family of kaolinites containing at least 75% by dry weight of the kaolinite, preferably at least 80% by weight.

DETAILED DESCRIPTION OF THE PREFERRED EMBODIMENTS OF THE INVENTION

More particularly according to the present invention, the percentage of the kaolinite is expressed on the basis of a dried clay, i.e., after calcination at a temperature of 1,000° C. for two hours. More generally, all concentrations given herein or percentages expressed for dry materials are determined after calcination at a temperature of 1,000° C. for two hours.

The effectiveness of an adsorbent in the PSA or TSA process may be evaluated by measuring the following characteristics for a given compound to be adsorbed, in the present case nitrogen, which is the principal impurity:

Dynamic weight capacity (Cdp): expressed in g of $N_2$ adsorbed/100 of the adsorbent;

Desorption yield (Rdt): represents the ratio of the amount of $N_2$ desorbed to the amount of $N_2$ adsorbed;

Filling density (DRT): expressed in grams of adsorbent/cm$^3$ and representing the mass of the adsorbent that may be introduced into a container of given volume;

Dynamic volume capacity (Cdv):

$$Cdv = Cdp \times DRT \ (g\ N_2/100\ cm^3);$$

Corrected dynamic weight capacity (Cdpc):

$$Cdpc = Cdp \times Rdt$$

Corrected dynamic volume capacity (Cdvc):

$$Cdvc = Cdv \times Rdt$$

These characteristics are determined by a test performed on an adsorbent conditioned by flushing same with nitrogen at 300° C. for three hours. A column is filled at 25° C. with the treated and dry sieve, and the column is supplied with helium. At time $t=0$, one fifth of the helium is replaced by nitrogen. When nitrogen is detected at the outlet, at time $t=tp$, also designated the piercing time, the helium is returned to its initial flow rate, the nitrogen having been eliminated. The amount of nitrogen adsorbed is then recorded for a duration equal to tp.

The dynamic weight capacity (Cdp) is thus equal to the amount of nitrogen adsorbed between the time $t=0$ and the time $t=tp$, relative to 100 g adsorbent, the yield being equal to the proportion of nitrogen eluted relative to the amount adsorbed during a duration of elution equal to tp.

According to another characteristic of the invention, the clay of the kaolinite family contains a maximum of approximately 20% by dry weight of quartz, preferably a maximum of 12%.

The weight concentration of the clay binder in the adsorbent advantageously ranges from about 10% to about 40% by dry weight, preferably from 10% to 30% by weight.

The clay binder preferably consists essentially of kaolinite in the form of hexagonal platelets, with the major part of the platelets having a diameter of a circumscribed circle of from 500 to 5,000 Å.

Another characteristics feature of the invention is that the zeolite is a 5A type zeolite. Advantageously, the zeolite has a concentration in halogens, and more particularly in chloride values, of less than 0.15% by dry weight.

This invention also features a process for the purification of gases by the PSA or "Pressure Swing Adsorption" or TSA or "Temperature Swing Adsorption" methods employing an adsorbent based on a molecular sieve, and wherein said adsorbent comprises a clay binder of the kaolinite family, as described above.

The adsorbent of the invention has mechanical properties sufficient to accommodate the pressure or temperature differences in the PSA and TSA processes, and high adsorption properties, and particularly an adsorption capacity that is clearly superior to those containing a clay binder that does not belong to the kaolinite family.

The adsorbent of the invention is well adapted for the purification of gases by the adsorption of impurities, such as nitrogen, carbon oxides, methane, hydrocarbons.

It is applicable, for example, to the purification of hydrogen and air.

The molecular sieves according to this invention are characteristically 5A type zeolites.

A description of the preparation of a type 5A zeolite will now be given.

Such 5A zeolite is produced from a type 4A zeolite by replacing a part of the sodium cations by divalent cations, such as calcium cations.

The 4A zeolite is itself produced by the crystallization of a mixture of sodium aluminate and sodium silicate. This mixture is in the form of a gel and crystallizes slowly at a temperature of approximately 90° C. The resulting precipitate is then washed and filtered.

This zeolite is contacted with a solution of calcium chloride. The suspension obtained in this manner is agitated for approximately one hour, then filtered and dried.

This cation exchange capacity of a zeolite is conventional to this art.

By modifying the concentration in $CaCl_2$ of the solution, the temperature or duration of contact of the zeolite with the $CaCl_2$ solution, the extent of the exchange between the divalent cation (calcium) and a monovalent cation (sodium) may be varied.

As will hereinafter be shown, the adsorption properties, such as Cdp, are affected only slightly by the proportion or extent of zeolite exchange. However, it is preferable to use zeolites reflecting an exchange proportion of at least 65%, preferably ranging from 65% to 85%.

Also, in the example given above the monovalent cation has been exchanged with the cation that is most frequently used. Nonetheless, an exchange with other divalent cations too is intended, with the resulting zeolites also being suitable for use according to the invention.

The zeolites are then dried. However, it is optional to first wash them to eliminate certain impurities, such as chlorine.

The zeolite powder obtained in this manner is admixed according to the invention with a clay of the kaolinite family. This mixture is kneaded to formulate a paste, which may then be molded, for example by extrusion or granulation.

In a preferred embodiment of the invention, the adsorbent is molded by extrusion.

It is possible, if necessary, to add certain additives to the mixture to facilitate the extrusion process, such as for example lubricants, plasticizers, with carboxymethylcellulose being one example of a lubricating additive.

The extruded shaped articles are subsequently dried to eliminate the maximum amount of interstitial water at a moderate temperature. Drying is carried out at a temperature on the order of 100° C. The resulting product has an ignition weight loss (PAF) on the order of 20%, after drying at 1,000° C.

The dried material is then activated by calcination to eliminate the remainder of the interstitial water and all of the adsorbed water.

Several such calcination processes are described in the literature and are useful for drying zeolites or adsorbents based on zeolites.

One of the preferred processes of the invention is a calcination by flowing hot air onto the adsorbent to be calcined, such as hot air at a temperature of about 600° C. It will be appreciated that other processes are also suitable according to this invention.

The adsorbents obtained by the process described above are then evaluated by the aforementioned test to determine the dynamic weight capacity of adsorption relative to nitrogen, which is a characteristic value of these materials.

In order to further illustrate the present invention and the advantages thereof, the following specific examples are given, it being understood that same are intended only as illustrative and in nowise limitative.

COMPARATIVE EXAMPLES 1 TO 3

The adsorbents were prepared from the same type of 5A zeolite having a proportion of exchange equal to 75% and a chlorine content of less than 0.15% by weight.

They were molded by extrusion, after mixing with 30% of different clays.

The results of the nitrogen adsorption test are reported in Table I.

TABLE I

Comparison of different clays

| Example | Clay | Weight % | DRT | $CdpN_2$ | Cdvc |
|---------|------|----------|------|----------|------|
| 1 | Kaolin (1) | 30 | 0.77 | 0.53 | 0.41 |
| 2 | Montmorillonite (2) | 30 | 0.70 | 0.35 | 0.24 |
| 3 | Attapulgite (3) | 30 | 0.51 | 0.41 | 0.21 |

(1) clay from the Provins quarries (90.3% kaolinite, 6.2% quartz)
(2) clay marketed under the designation of Bentonite
(3) clay marketed as Attagel These examples clearly show the superiority of the adsorbent according to the invention (Example 1) containing kaolin as the binder.

EXAMPLES 4 TO 9

In Examples 4 to 9 the adsorbents were produced by mixing a type 5A zeolite with 30% of a clay binder of the kaolinite family (from different deposits), the quartz and kaolinite contents of the different clays being variable. The results are reported in Table II.

TABLE II

| Example | 4 | 6 | 7 | 8 | 9 |
|---|---|---|---|---|---|
| Clay Commerical name | Kaolin SG | Vercoryls | B 22 | MB 30 | PN 34 |
| Supplier | Pro-vins | Vercors | Clays and Minerals (Charentes) | Pro-vins | Pro-vins |
| % quartz | 6.2 | 6.3 | 5.3 | 34.9 | 23.4 |
| % kaolinite | 90.3 | 88.1 | 90.1 | 59.9 | 71.3 |
| DRT | 0.77 | 0.67 | 0.69 | 0.71 | 0.72 |
| CdpN$_2$ | 0.53 | 0.52 | 0.57 | 0.28 | 0.32 |
| CdvCO$_2$ | 0.41 | 0.35 | 0.40 | 0.20 | 0.23 |

EXAMPLES 10 TO 14

These examples were carried out in a manner identical with the preceding examples, but by using several kaolins containing different amounts of quartz and kaolinite and originating from the same quarry.

The clay binder content was again 30%.

All of the compositions are according to the invention and have high adsorption properties, which differ but slightly, as indicated by the results reported in Table III.

TABLE III

| Example | 10 | 11 | 12 | 13 | 14 |
|---|---|---|---|---|---|
| Clay | SG1 | SG2 | SG3 | CH1 | CH2 |
| Origin | Kaolin of PROVINS "Saint-Genoy" clay | | | Kaolin of PROVINS "Chalotres" clay | |
| % quartz | 8.7 | 3.3 | 0.65 | 7.7 | 3.8 |
| % kaolinite | 87.4 | 92.3 | 95.7 | 87.8 | 91.8 |
| DRT | 0.64 | 0.62 | 0.625 | 0.63 | 0.63 |
| Cdp | 0.61 | 0.60 | 0.64 | 0.62 | 0.62 |
| Cdvc | 0.39 | 0.37 | 0.40 | 0.39 | 0.39 |

EXAMPLES 15 TO 18

The adsorbents were produced in the same manner as in Example 4 from the same kaolin and zeolite, but with different concentrations of the clay binder. The results reported in Table IV clearly show that for a binder concentration of from 10% to 40% by weight, and preferably from 10% to 30% by weight, the adsorbent properties are at a high level.

TABLE IV

| Example | 16 | 17 | 18 | 19 |
|---|---|---|---|---|
| Proportion of binder | 10 | 20 | 30 | 40 |
| CdpN$_2$ | 0.54 | 0.56 | 0.53 | 0.43 |
| CdVc | 0.32 | 0.37 | 0.37 | 0.32 |
| DRT | 0.64 | 0.74 | 0.77 | 0.82 |
| EGG$^{N/mm}$ | 8.53 | 14.87 | 16.66 | 23.54 |

These examples indicate that it is possible to substitute a relatively large amount of the molecular sieve or zeolite, which is an expensive product, with kaolinite without appreciably modifying the adsorption capacity of the adsorbent.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An adsorbent material adapted for the purification of gases by adsorbing impurities therefrom that are more polar or polarizable than the gases to be purified, comprising a matrix of a 5A zeolite molecular sieve and a kaolinite containing clay binder therefor, said clay binder comprising a concentration of at least 75% by dry weight of kaolinite and a maximum quartz concentration of 20% by dry weight.

2. The adsorbent material as defined by claim 1, comprising from 10% to 40% by weight of said kaolinite clay binder.

3. The adsorbent material as defined by claim 2, comprising from 10% to 30% by weight of said kaolinite clay binder.

4. The adsorbent material as defined by claim 1, said clay binder comprising a concentration of at least 80% by dry weight of kaolinite.

5. The adsorbent material as defined by claim 1, said clay binder comprising a maximum quartz concentration of 12% by dry weight.

6. The adsorbent material as defined by claim 1, said clay binder comprising hexagonal platelets of kaolinite, the major portion of which having a mean diameter ranging from 500 to 5,000 Å.

7. The adsorbent material as defined by claim 1, said 5A zeolite molecular sieve being at least 65% divalent cation exchanged.

8. The adsorbent material as defined by claim 7, said 5A zeolite molecular sieve being from 65% to 85% divalent cation exchanged.

9. The adsorbent material as defined by claim 7, said exchanged divalent cation being calcium.

10. The adsorbent material as defined by claim 1, said 5A zeolite molecular sieve having a halogen concentration of less than 0.15%.

* * * * *